(No Model.)

J. J. ALLEN.
BOTTLE.

No. 580,968.   Patented Apr. 20, 1897.

WITNESSES
John Buckler,
C. Gerst.

INVENTOR
James Joseph Allen.
BY
Edgar Tate & Co.
ATTORNEYS.

UNITED STATES PATENT OFFICE.

JAMES JOSEPH ALLEN, OF NEWARK, NEW JERSEY.

BOTTLE.

SPECIFICATION forming part of Letters Patent No. 580,968, dated April 20, 1897.

Application filed December 24, 1896. Serial No. 616,909. (No model.)

*To all whom it may concern:*

Be it known that I, JAMES JOSEPH ALLEN, a citizen of the United States, residing at Newark, in the county of Essex and State of New Jersey, have invented certain new and useful Improvements in Bottles, of which the following is a full and complete specification, such as will enable those skilled in the art to which it appertains to make and use the same.

This invention relates to bottles, jugs, jars, and similar vessels, and the object thereof is to provide a vessel of this class with a neck attachment which is so constructed that when the vessel has been filled and the neck attachment secured in place the bottle may be emptied of its contents and cannot be refilled or reused.

The invention is fully disclosed in the following specification, of which the accompanying drawings form a part, in which—

Figure 1:
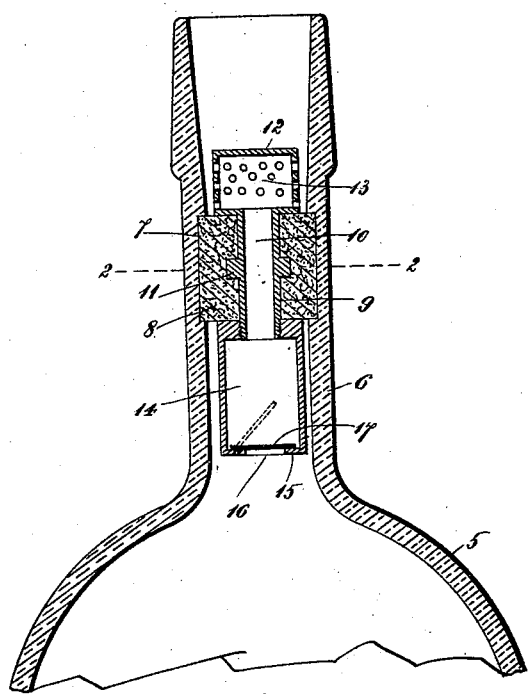
Figure 2:
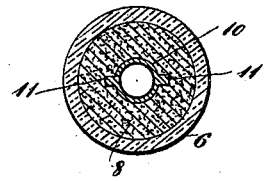

Figure 1 is a central vertical section of the upper part of a bottle and the neck thereof provided with my improvement, and Fig. 2 a transverse section on the line 2 2 of Fig. 1.

In the drawings forming part of this specification the separate parts of my improvement are designated by the same numerals of reference throughout both views, and in the practice of my invention I provide a bottle 5, having a neck 6, in which is formed an annular groove 7, which is of sufficient vertical width to receive a cork 8. The cork 8 is provided with a small central vertical bore or passage 9, and I also provide a central tube 10, which is preferably composed of rubber and which is provided centrally with outwardly-directed wings or projections 11, and in practice the cork 8 is boiled and the tube 10 is passed thereinto or therethrough, and when the cork has had time to cool the tube will be securely held therein.

Formed on or secured to the upper end of the tube 10, in any desired manner, is a cylindrical hollow casing 12, which is also preferably composed of hard rubber, but which may be composed of any desired material, and the top thereof is closed and the side walls perforated, as shown at 13. The lower end of the tube 10 is also provided with a cylindrical or tubular casing 14, which is connected with said tube by a screw-thread or in any desired manner, and which is also composed of rubber or any preferred material, and the lower end thereof is provided with an inwardly-directed annular flange 15, through which is formed a port or passage 16, and hinged or otherwise secured to the upper surface of the inwardly-directed annular flange or rim 15 is a flexible rubber valve 17.

The cylindrical or tubular casing 14 is preferably slightly of less diameter than the inner walls of the neck, but may be of the same diameter, or of such diameter to enable it to freely slide in said neck, as shown in Fig. 1, and the cylindrical casing 12, which is secured to the upper end of the tube 10, is of less diameter than the inner walls of the neck in order that the device may operate as hereinafter described.

The operation will be readily understood from the foregoing description when taken in connection with the accompanying drawings and the following statement thereof.

The bottle or vessel 5 is first filled with the desired contents, after which the attachment is forced into the neck of the bottle until the cork or stopper 8 reaches the annular groove 7, into which it expands, as will be readily understood, and said attachment cannot be removed from the neck of the bottle without breaking off the latter. After the attachment has been placed in position the upper end of the neck of the bottle may be closed by a cork or stopper in the usual manner, and when it is desired to empty the bottle or discharge a portion of its contents said cork or stopper is removed and the bottle inverted or tilted. When the bottle is inverted or tilted, the valve 17 will be forced from its seat by pressure of the liquids in the bottle and the contents will flow out through the casing 14 through the tube 10 and through the side walls of the casing 12, and this operation may be continued or repeated until the bottle is entirely emptied. The valve 17 is preferably composed of flexible rubber, and is secured in position in such manner that very slight pressure will suffice to open it, as described, and as soon as the pressure is removed the valve will be closed, and it will therefore be apparent that the bottle or vessel having been once emptied cannot be refilled by pouring liquids thereinto and cannot be refilled by forcing the liquids in the neck thereof.

My improvement is simple in construction and operation and does not add materially to the cost of the bottle, and it is evident that changes in and modifications of the construction herein described may be made without departing from the spirit of my invention or sacrificing its advantages.

Having fully described my invention, I claim as new and desire to secure by Letters Patent—

A bottle or containing vessel consisting of a bottle 5, neck 6, annular depression 7 formed on the inside of the neck to any suitable depth and of such length as to correspond to the length of a standard cork in combination with a device placed in the depression 7; said device consisting of a cork 8, provided with a central vertical opening 9, said cork being expanded by boiling, a tube 10 provided centrally on its outer surface with lugs or the like passed into said cork while in the expanded condition, a cylindrical hollow casing 12, securely fastened to the upper end of the tube 10, said casing having perforated side walls and inclosed top, a cylindrical hollow casing 14, securely fastened to the lower end of the same tube, the lower end of said casing being provided with an inwardly-directed annular flange 15, forming a central port or passage 16, and a flexible rubber valve or the like, hinged or suitably fastened to the inside of the annular flange 15, all being arranged to operate substantially as described.

In testimony that I claim the foregoing as my invention I have signed my name, in presence of the subscribing witnesses, this 22d day of December, 1896.

JAMES JOSEPH ALLEN.

Witnesses:
CHARLES S. ROGERS,
C. GERST.